United States Patent Office 3,467,726
Patented Sept. 16, 1969

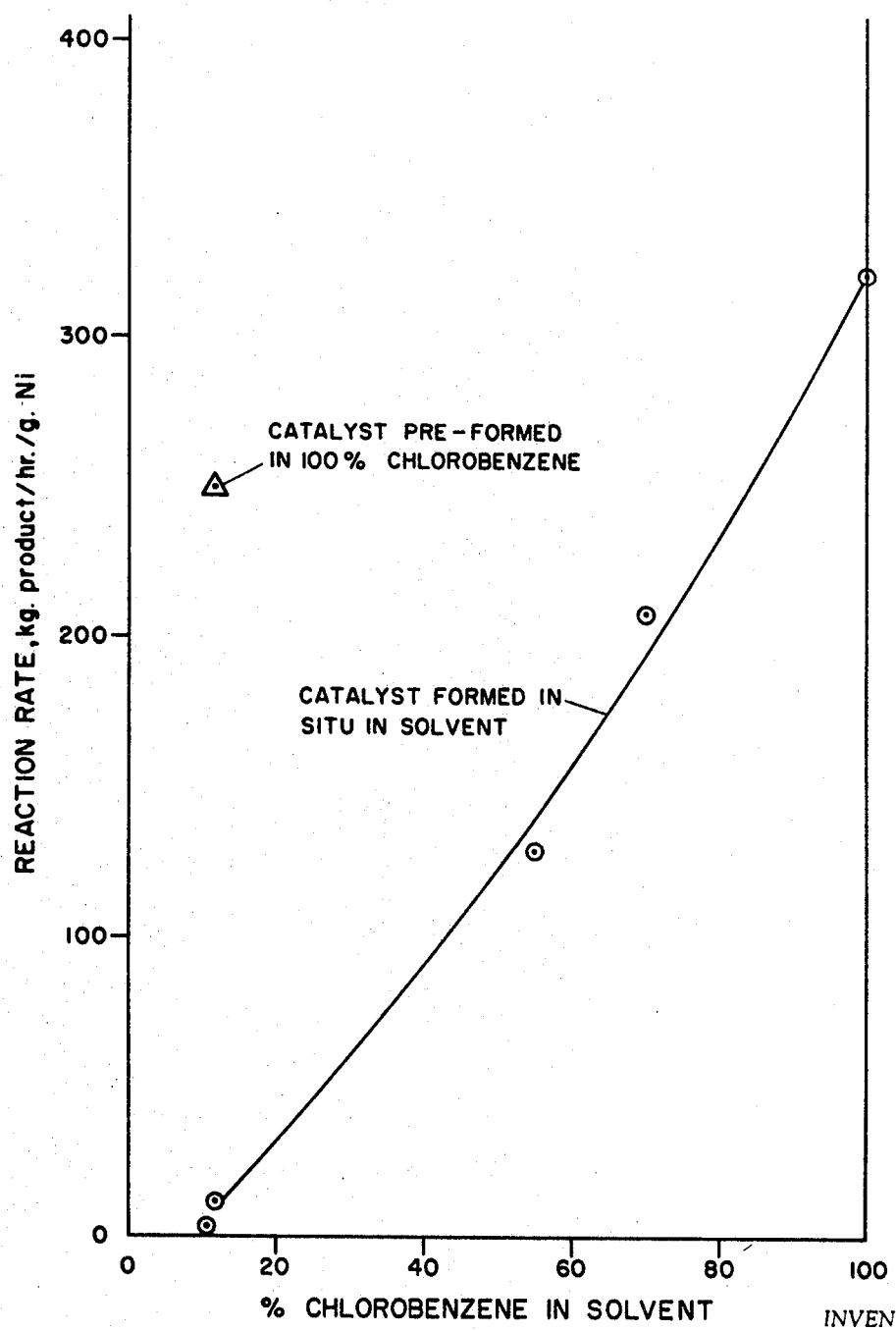

---

3,467,726
DIMERIZATION OF OLEFIN HYDROCARBONS
William P. Griffin, Jr., Wilmington, Del., assignor to Sun Oil Company, Philadelphia, Pa., a corporation of New Jersey
Filed July 25, 1968, Ser. No. 747,570
Int. Cl. C07c *3/18;* B01j *11/78*
U.S. Cl. 260—683.15                 20 Claims

ABSTRACT OF THE DISCLOSURE

Monoolefins are dimerized by contact at 100° C. to 200° C., preferably −50° C. to 100° C., with catalyst systems preformed by combining (1) certain types of nickel (II) halide phosphine coordination complexes, e.g. $(R_3P)_2NiX_2$, and (2) a Lewis acid which is $RAlX_2'$, $R_3Al_2X_3'$ or $R_2AlX'$ in a small amount of halogenated benzenoid hydrocarbon, e.g., chlorobenzene, the preformed catalyst then being employed in a predominantly hydrocarbon solvent for dimerizing the monoolefin.

CROSS REFERENCE TO RELATED APPLICATION

Application Ser. No. 675,280, filed Oct. 16, 1967, by Gert G. Eberhardt describes catalyst systems formed by combining (1) certain nickel halide phosphine complexes, e.g., $(R_3P)_2NiCl_2$, with (2) hydrocarbyl aluminum halides, which catalyst systems are active for dimerizing olefins. The present invention provides an improvement in the formulation and utilization of catalyst systems involving these types of components, whereby high activities can be secured with less expensive solvents.

BACKGROUND OF THE INVENTION

This invention relates to the dimerization and/or co-dimerization of olefin hydrocarbons by means of highly active catalyst compositions made from a certain type of nickel (II) complex.

The aforesaid Eberhardt application United States Ser. No. 675,280 describes the dimerization of monoolefins by contacting same with catalyst systems formed by combining certain types of nickel halide phosphine complexes with certain Lewis acids which are hydrocarbyl aluminum chlorides or bromides, being either monohalides, sesquihalides or dihalides ($R_2AlX'$, $R_3Al_2X_3'$ or $RAlX_2'$). The Lewis acid is used in amount such that the Al:Ni ratio in the system is in excess of 2:1 and preferably far in excess thereof, e.g., 10–100:1. As described in said application, these catalyst systems are prepared by combining the catalyst components in a suitable solvent and then utilizing the resulting solution as the medium in which the olefin feed, e.g., propylene, is reacted. While a hydrocarbon such as benzene or toluene can be used as the solvent, the resulting catalyst has relatively low activity. On the other hand, halobenzenoid hydrocarbons, e.g., chlorobenzene, are shown to give highly active catalyst systems, and accordingly the use of such halogen-containing hydrocarbons as catalyst solvent and medium for the dimerization reaction is taught to be essential for securing high catalytic activity.

SUMMARY OF THE INVENTION

The present invention constitutes a specific improvement in the formulation and use of catalyst systems of the kind disclosed in the aforesaid patent application. Preparation of the catalyst involves use of the same two types of components, i.e., the same nickel halide phosphine complexes and the same Lewis acids in the same proportions. However, the catalyst is formulated in a way so that the use of an expensive solvent, such as chlorobenzene, as the dimerization reaction medium is minimized while still securing the desired high catalytic activity. In the present invention the solvent in which the catalyst is contacted with the olefin feed is composed at least mainly of liquid hydrocarbon, but nevertheless the catalyst exhibits extraordinarily high activity for effecting dimerization and/or codimerization of olefins.

It has now been discovered that high catalytic activity can be achieved while utilizing mainly liquid hydrocarbon as the dimerization reaction medium provided that the catalyst components are first reacted in chlorobenzene, or other halogenated benzenoid solvent as described hereinafter, to form the active catalyst and then utilizing the pre-formed catalyst dissolved in solvent which is at least mainly hydrocarbon to effect dimerization of the feed olefin. The invention thus involves pre-forming the catalyst in a relatively small volume of the liquid halogenated benzenoid hydrocarbon, admixing the so-formed catalyst with a relatively large volume of hydrocarbon solvent and contacting the olefin feed at a temperature in the range of −100° C. to 200° C., more preferably −50° C. to 100° C., with the resulting catalyst to effect dimerization. It is often preferable that the hydrocarbon solvent with which the pre-formed catalyst is admixed is the feed olefin itself which is to be dimerized, the same being used in liquid form as the solvent. This eliminates the need for having to supply any other hydrocarbon material as solvent.

Catalyst systems prepared according to the invention have particular utility in the dimerization of propylene mainly to either dimethylbutenes or methylpentenes depending upon the nature of the hydrocarbyl groups in the phosphine moiety of the catalyst. The invention thus provides, for example, a means of converting propylene into 2,3-dimethylbutene which can be hydrogenated to 2,3-dimethylbutane, an especially valuable component for motor fuel of high antiknock quality.

BRIEF DESCRIPTION OF THE DRAWING

The accompanying drawing is a plot showing reaction rates in the oligomerization of propylene against the content of chlorobenzene in the reaction solvent medium, the remainder of the solvent being n-heptane. In the drawing the curve shows results obtained when the catalyst is formed in situ in the final reaction solvent medium, while the single point illustrates the effect of pre-forming the catalyst in accordance with the invention.

DESCRIPTION OF THE INVENTION

The nickel halide phosphine components of the present catalysts are coordination compounds of nickel (II) corresponding to any of the following formulas:

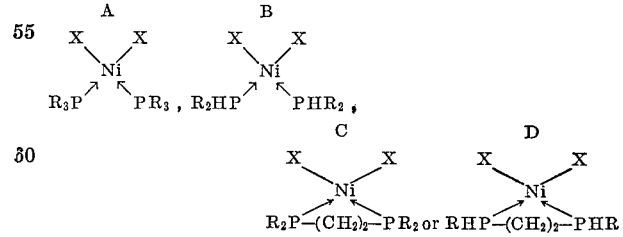

wherein X is chlorine, bromine or iodine. R in all of these formulas represents any hydrocarbyl radical having 1–30 carbon atoms selected from the group consisting of alkyl, cycloalkyl, alkenyl, cycloalkenyl, aryl, aralkyl and aralkenyl. While the R groups can have an important influence on the structure of the dimer product depending on the type of R group present in the coordination complex and also can have an influence with respect to degree of solubility of the resulting catalyst, any R group (or groups) as above specified is (or are) operative for preparing catalyst systems in accordance with the invention. The R groups in the coordination complex employed can be the same or different hydrocarbyl radicals. Of the four types of coordination complexes shown Type A generally is preferred.

The second component of the present catalyst system is a Lewis acid which is a hydrocarbyl aluminum halide. These Lewis acids include hydrocarbyl aluminum dihalides, hydrocarbyl aluminum sesquihalides and dihydrocarbyl aluminum halides, wherein the halogen is chlorine or bromine. In other words the Lewis acids are of the group $RAlX_2'$, $R_3Al_2X_3'$, and $R_2AlX'$, wherein X is chlorine or bromine and the Rs again are any hydrocarbyl radicals having 1–30 carbon atoms selected from the same group as specified above for R.

The catalyst is pre-formed in accordance with the invention by bringing together the two catalyst components while dissolved in a relatively small proportion of a liquid halogenated benzenoid hydrocarbon having 1–2 halogen atoms attached to the benzene ring. Preferably a small amount of the olefin to be dimerized or of other dimerizable olefin is also present at the time of bringing the catalyst components together to aid in activating the catalyst. When these materials are brought together, an exothermic reaction occurs and the active catalyst forms.

The proportion of Lewis acid component used relative to the nickel coordination complex should be such that the Al:Ni atomic ratio is in excess of 2:1 and preferably is at least 10:1, e.g., in the range of 10:1 to 100:1. Larger proportions of the Lewis acid are not detrimental. Excess Lewis acid can act as a scavenger for catalyst poisons, such as moisture and oxygen, which may be present in the system. A large excess of the Lewis acid also is particularly important when an iodide of nickel has been used to prepare the coordination complex (i.e., where X is iodine), as development of the active catalyst depends upon chlorine or bromine being interchanged with iodine upon addition of the Lewis acid. A large excess of the Lewis acid aids this interchange.

The temperature at which the catalyst is pre-formed by bringing the components together in the halogenated benzenoid hydrocarbon medium has an influence on the activity of the resulting catalyst. This temperature generally should be in the range of 0 to 150° C. and more preferably 20 to 80° C. The catalyst activity generally increases as the pre-forming temperature increases up to about 150° C. However, when the catalyst is to be used for dimerizing propylene to 2,3-dimethylbutene, increasing temperature in the preforming step tends to lower catalyst selectivity and increase production of methylpentenes in the subsequent dimerization step. Hence, for making 2,3-dimethylbutene, it is usually desirable to keep the temperature in the range of 20–35° C. during the catalyst pre-forming step. Upon bringing the catalyst components together with a minor amount of olefin present, an exothermic reaction results due to dimerization of the olefin. Hence cooling of the mixture by external means usually is desirable while the catalyst is being preformed.

The solvent in which the catalyst components are brought together, preferably in the presence of a small amount of olefin, to pre-form the catalyst is a liquid halobenzenoid hydrocarbon. The preferred solvent is chlorobenzene. However any other halobenzenoid hydrocarbon containing one or two halogen atoms attached to the benzene ring and which is liquid at the operating temperature can be used. This includes monohalo and dihalo aromatics in which the halogen is chlorine, bromine, fluorine or iodine and is attached to the benzene ring. The following are examples of other suitable solvents for the preforming step: bromobenzene; fluorobenzene; iodobenzene; 1,3-dibromobenzene; 1,2- or 1,3-dichlorobenzen; 2- or 3-bromotoluene; 2- or 3-chlorotoluene; 2- or 3-fluorotoluene; 2,5- dichlorotoluene; 1-chloro-3,4-dimethylbenzene; 1-chloro-2,5 - dimethylbenzene; 1-bromo-2,4-dimethylbenzene; 1-chloro- or 1-bromo-2,4,6-trimethylbenzene; and 1-chloro- or 1-bromo-2,3,5-trimethylbenzene. These solvents evidently are not inert in the catalyst pre-forming step but react with the catalyst components in some essential manner not presently known with certainty.

For the purpose of simplifying description of the invention, the solvent hereinafter will be considered as chlorobenzene. It is to be understood, however, that any of the other haloaromatic solvents as above specified can be substituted therefor with substantially equivalent results.

Only a relatively small proportion of chlorobenzene need be used in preforming the catalyst and the resulting catalyst can then be diluted with a relatively large volume of liquid hydrocarbon solvent for use in dimerizing the feed olefin. The hydrocarbon solvent can be any inert hydrocarbon that is normally liquid or that can be maintained as a liquid at the conditions under which the dimerization reaction is effected, examples being n-butane or isobutane, pentanes, hexanes, octanes, benzene, toluene, xylenes and the like. It is often desirable, however, to utilize the feed olefin in liquid phase as the solvent for the dimerization reaction mixture. For example, when the feed olefin is propylene, the catalyst preformed in a relatively small amount of chlorobenzene can then be added to a relatively large volume of liquid propylene which functions both as solvent and as the monomeric feed. Once the catalyst has been preformed in chlorobenzene, the presence of chlorobenzene in the final reaction mixture is not essential.

In the preforming step the proportion of the nickel-phosphine coordination compound added to the chlorobenzene typically is such that the nickel concentration is from 0.1 to 10 millimoles Ni per liter of solution. After the catalyst has been preformed, it is admixed with a relatively large volume of hydrocarbon solvent such that the nickel concentration during the dimerization reaction typically is in the range of 0.05 to 0.0005 millimole Ni per liter of solution. Accordingly the amount of chlorobenzene needed for practicing the invention is small compared to the volume of final reaction mixture. Furthermore, since exceed feed olefin can function as the solvent in the dimerization reaction, overall solvent costs for the process become practically negligible.

Catalyst systems prepared as described above can be used for converting monoolefins to oligomers which are mainly dimers of the starting olefins. Any such olefins, whether being terminal or internal olefins, can be made to dimerize and/or codimerize by means of these catalysts, provided that the olefin has its double bond between two carbon atoms neither of which is attached to more than one carbon atom. This applies to straight chain and branched aliphatic olefins as well as to cyclic olefins. In other words the present catalysts can be employed for converting to oligomers (mainly to dimers) any monoolefin in which the double bond is between carbon atoms that have no side substituent such as a methyl group or higher side chain. The catalysts are particularly useful for effecting the dimerization or codimerization of $C_2$–$C_{10}$ aliphatic monoolefins; such as the following: ethylene; propylene; butene-1; butene-2; pentene-1; pentene-2; pentene-3; 4-methylpentene-1; 3,3-dimethylbutene-1; 3,4-dimethylpentene-1; octene-1; 2,5-dimethylhexene-3; 4-ethylhexene-2; nonenes; etc. Examples of other olefins that can be made to dimerize by means of the present catalysts are dodecenes; cetenes; eicosenes; docosenes; cyclopentene; cyclohexene; methylcyclohexenes; dimethylcyclohexenes; and cyclooctene; in all of which olefins the carbon atoms forming the double bond have no side substituents. When two or more olefins are present in the charge, codimerization will occur as well as dimerization. Hence, when the term "dimerization" is used herein, it is intended to include codimerization as well if the olefinic charge material contains more than one olefin component.

The dimerization reaction can be carried out by contacting a monoolefin as above specified or a mixture of such olefins with a hydrocarbon solution of the preformed catalyst at a temperature in the range of $-100°$ C. to $200°$ C., more preferably $-50°$ C. to $100°$ C. The rate of dimerization at any selected reaction temperature will depend upon the particular olefinic charge employed, and will vary inversely with the molecular weight of the starting olefin. The rate also will depend upon the accessibility of the double bond for contact with the catalyst species. In any event the present catalysts are highly active even though the catalysts are employed in a predominantly hydrocarbon medium. By way of example, for a propylene feed, typical reaction rates at $0°$ C. are of the order of 50–1000 kg. of product/hr./g. of Ni.

The reaction product is preponderantly the dimer and/or codimer, or in other words is product resulting from the combination of two molecules of charge olefin per molecule of product. However, minor amounts of higher molecular weight olefins usually are also obtained, perhaps due to interaction of dimer or codimer product with additional charge material or with itself. As a general rule the amount of these higher boiling products can be held to less than 25% by weight of the total olefin reacted.

The manner in which two molecules of the starting olefin combine to yield the dimer will depend upon the particular R groups in the phosphine component, i.e., the $R_3P$ moiety, of the catalyst system. For example, when propylene is the charge olefin, R groups in the $R_3P$ moiety that impart thereto relatively high electron-accepting character, such as phenyl tolyl or naphthyl, tend to result in methylpentenes as the predominant product structure. In such cases the dimerization reaction takes place mainly as follows:

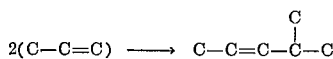

On the other hand, R groups which impart an electron-donating character to the $R_3P$ moiety, such as isopropyl, t-butyl, cyclopentyl or cyclohexyl, tend to cause 2,3-dimethylbutenes to be the main product. In such cases the dimerization reaction proceeds mainly as follows:

Hence the invention allows different specific dimers to be obtained as the major product by appropriate selection of the R groups for the phosphine which forms the $R_3P$ moiety. As a rough indication of the effect of various types of R groups in the phosphine, the following is a listing of R group types in the order generally exhibited for decreasing electron-accepting ability: aryl; aralkenyl; aralkyl; alkenyl; cycloalkenyl; saturated hydrocarbon group (alkyl or cycloalkyl) attached to the phosphorous atom through a primary carbon atom; and saturated hydrocarbon groups attached to the phosphorous atom through a secondary or tertiary carbon atom. However, this order is subject to variation depending upon the specific hydrocarbon groups involved. For instance, an aralkyl group in which the alkyl moiety is long or an alkenyl group where the double bond is remote from the carbon atom attached to the phosphorous atom can cause the catalyst to function in substantially the same way as if it were prepared from a phosphine in which the R groups are alkyl.

The present catalyst, in addition to effecting dimerization, can also cause isomerization of the double bond in the olefinic product and to some extent in the starting olefin. Hence the position of the double bond in the dimer product will depend upon the specific conditions under which the reaction is carried out and particularly the length of time at which the dimer is allowed to remain in contact with the catalyst system. For example, when propylene is dimerized using a catalyst in which the phosphine is triphenylphosphine, the main dimer initially formed is 4-methylpentene-2; but if this is allowed to remain in contact with the catalyst for substantial time, it tends to isomerize to other methylpentenes. When tricyclohexylphosphine is used instead, the main initial dimer is 2,3-dimethylbutene-1, but continued contact of this product with the catalyst tends to cause isomerization to 2,3-dimethylbutene-2. Prolonged contact of the product with the catalyst system after the charge olefin has been consumed can also cause part of the product to dimerize and yield products of still higher molecular weight.

When the desired product from propylene dimerization is 2,3-dimethylbutene, it is best that all R groups in the $R_3P$ moiety of the nickel complex used to form the catalyst be saturated hydrocarbon groups attached to the phosphorous through a secondary or tertiary carbon atom. Also, the reaction temperature for producing this particular dimer preferably is below $25°$ C., e.g., $0°$ C. or lower, since the selectivity for its production from propylene tends to become poorer as temperature increases. On the other hand the rate of production of total oligomer tends to increase with increasing temperature.

The present catalysts cannot be used in the presence of highly polar compounds. Solvents which have high dipole moments, such as alcohols, ketones, esters, amines, dioxane and tetrahydrofuran, would irreversibly coordinate with the nickel and deactivate the catalyst and hence must be avoided. Air or oxygen likewise should be excluded from the system. Solvents employed and olefin feedstocks should be substantially anhydrous.

In formulating the catalyst system preparatory to carrying out the dimerization reaction, a nickel coordination complex of types A, B, C or D as above specified is first prepared. Such nickel halide phosphine complexes are known and are described in Advances in Inorganic and Radiochemistry, vol. 6, pp. 27–30, Academic Press (1964). They can be made by dissolving the chloride, bromide or iodide of nickel (II) in an alcohol and adding a stoichiometric amount of the phosphine. The coordination complex forms readily and precipitates, and it is recovered by filtering the mixture and drying the residue. For the present purpose it is distinctly preferable to use either the chloride or bromide of nickel (II) to make the complex.

The following are some specific illustrations of coordination complexes prepared in this manner, in which R is phenyl and X is chlorine:

Type A: $NiCl_2 + 2$(triphenylphosphine) → bis(triphenylphosphine)nickel chloride Type B: $NiCl_2 + 2$(diphenylphosphine) → bis(diphenylphosphine)nickel chloride Type C: $NiCl_2 + 1,2$-bis(diphenylphosphine)ethane → 1,2-bis(diphenylphosphine)ethane nickel chloride Type D: $NiCl_2 + 1,2$-bis(phenylphosphine)ethane → 1,2-bis(phenylphosphine)ethane nickel chloride The bis-phosphines used in preparing the complexes of types C and D are chelating phosphines and the resulting chelate complexes likewise are known compounds as can be seen from the reference referred to above.

Use of the so-prepared coordination complex in the catalyst preforming step involves dissolving same in anhydrous chlorobenzene in amount such that the nickel content of the resulting solution is from 0.1 to 10 millimoles per liter, preferably 0.5–5 millimoles/liter. The solution is preferably purged with a stream of dry nitrogen ot remove any dissolved oxygen, following which a small amount of the olefin to be dimerized is admixed with the solution. For example, if propylene is to be the feed, gaseous propylene at a pressure of say 100 mm. Hg above atmospheric is contacted with the solution until the latter becomes saturated, thus providing the small amount of olefin that is desirable for facilitating activation of the catalyst. The Lewis acid, which is preferably an alkyl aluminum sesquichloride or sesquibromide, is then added while the mixture initially at about room temperature is being stirred. The proportion of Lewis acid to the nickel compound is such as to provide an Al:Ni atomic ratio above 2:1 and preferably of at least 10:1. Upon addition of the Lewis acid an exothermic reaction ensues due to dimerization of propylene present and the temperature tends to rise. The mixture preferably is cooled, if necessary, to keep the temperature below 80° C. and preferably below 35° C. when the catalyst is to be used for making 2,3-dimethylbutene from propylene. The catalyst typically has a bright yellow color.

The preformed catalyst system is then added to a relatively large volume of hydrocarbon in which the dimerization reaction is to be effected. The amount of hydrocarbon solvent with which the catalyst solution is admixed is such that the resulting nickel concentration will be in the range generally of 0.05 to 0.0005 and most typically of 0.05 to 0.005 millimole Ni per liter. The hydrocarbon solvent, as previously described, either can be an inert hydrocarbon such as n-heptane or toluene or can be the feed olefin used in excess amount in liquid phase. The dimerization reaction is effected merely by causing the olefin monomer to contact the soluble catalyst at any selected temperature in the range of −100° C. to 200° C. that gives a suitable rate of reaction. The reaction occurs in solution. Hence, when the starting olefin would otherwise be gaseous at the reaction temperature selected, sufficient pressure should be maintained to give it substantial solubility in the catalyst solution and the olefin should be added to maintain the pressure as the reaction proceeds.

When the charge is one or more aliphatic olefins of the $C_2$-$C_{10}$ range a temperature in the range of −50° C. to 100° C. generally is preferred. With the lower olefins sufficient pressure and also adequate agitation are used so that the gaseous feed will rapidly dissolve in the solution so as to maintain an adequate concentration thereof as the reaction proceeds. When propylene is the feed olefin and the desired dimerization product is 2,3-dimethylbutene, it is generally best to conduct the reaction at a relatively low temperature such as 0–10° C.

EXAMPLES 1 TO 6

In order to illustrate the advantage provided by the present invention over the procedure of United States application Ser. No. 675,280 referred to above, six runs were made on dimerizing propylene and results are plotted in the accompanying drawing. In five of the runs made in accordance with the prior procedure the catalyst was prepared in situ in the solvent medium used for the dimerization reaction. In one of these (Run 1) the solvent was 100% chlorobenzene, while in the other four runs (Runs 2–5) various blends of chlorobenzene and n-heptane were employed as listed in the table. The remaining run (Run 6) represents the invention and involved pre-forming the catalyst in a small amount of 100% chlorobenzene and then adding the solution to a large volume of n-heptane so that the resulting solvent mixture contained only 12% chlorobenzene by weight at the beginning of the dimerization reaction step.

More specifically, in each of Runs 1 through 6, the nickel complex was bis(triisopropylphosphine)nickel chloride and the Lewis acid was $(Et)_3Al_2Cl_3$. Runs 1–5 were carried out in the following manner. A 250 ml. flask provided with a magnetic agitator, means for cooling, temperature indicating means, and means for applying and maintaining a regulated pressure of propylene in the flask was used. The flask first was charged with 60 ml. of a 0.0004 molar solution of the nickel complex in solvent having the chlorobenzene content shown in the table, and then nitrogen was bubbled through the solution for 10 minutes to effect deaeration. Propylene pressure of 100 mm. Hg above atmospheric pressure was next applied, and while the mixture was being stirred at room temperature the Lewis acid was added in amount to provide an atomic ratio of Al:Ni of 20:1. This caused an exotherm which generally brought the temperature to about 35° C., following which the mixture was rapidly cooled to 0° C. within about two minutes. The reaction was continued by supplying propylene to maintain the pressure at 100 mm. Hg until a suitable amount of product had been produced. Reaction rate in each run generally was steady throughout the reaction period. At the end of the reaction time as listed in the table, aqueous alcohol was added to kill the catalyst and the reaction product was analyzed.

Run 6 was carried out in generally the same way as Runs 1–5 except that the same quantity of bis(triisopropylphosphine)nickel chloride was dissolved in only 7 g. of 100% chlorobenzene and no additional solvent was present when the $(Et)_3Al_2Cl_3$ was added. Again the system was deaerated, propylene was applied to a pressure of 100 mm. Hg and the same amount of Lewis acid was added to give an Al:Ni ratio of 20:1. Immediately after reacting the catalyst components in the chlorobenzene medium, the mixture was diluted with 53 g. of n-heptane and the dimerization reaction again was conducted at 0° C. The chlorobenzene content of the solvent thus was about 12% by weight at the start of the dimerization and, of course, continuously decreased during the run as dimerization product was formed.

Data for Runs 1–6 are shown in the table and are plotted in the accompanying drawing. The products in all of these runs were composed of 75–90% hexenes and 10–25% nonenes, and the $C_6$ fractions thereof were composed of 75–87% 2,3-dimethylbutenes and 13–25% methylpentenes, percentages being by weight. The high 2,3-dimethylbutene content of the product is typical when the R groups of the phosphine moiety of the catalyst are isopropyl or other saturated electron-donating R groups as previously explained.

TABLE.—DIMERIZATION OF PROPYLENE AT 0° C.

| Run No. | Chlorobenzene content of solvent*, wt. percent | | Duration of dimerization step, min. | Rate, kg. of product hr./g. Ni |
|---|---|---|---|---|
| | Upon mixing catalyst components | At start of dimerization | | |
| 1 | 100 | 100 | 11 | 330 |
| 2 | 70 | 70 | 25 | 208 |
| 3 | 55 | 55 | 24 | 129 |
| 4 | 12 | 12 | 13 | 11 |
| 5 | 11 | 11 | 15 | 4 |
| 6 | 100 | 12 | 6 | 250 |

* Remainder of solvent: n-heptane.

The drawing shows reaction rates for Runs 1–6, expressed as kilograms of oligomer product per hour per gram of nickel in the catalyst, plotted against the weight percent of chlorobenzene in the liquid dimerization medium at the beginning of the dimerization reaction. The curve represents the results for Runs 1–5 where the catalyst was formed in situ in the dimerization solvent. It can be seen that a high reaction rate is obtained when the solvent has a high content of chlorobenzene but that the rate drops off sharply as the chlorobenzene content decreases. In contrast, Run 6, represented by the single point, shows that if the catalyst is preformed in chlorobenzene it can then be used in a predominantly hydrocarbon medium and remarkably high reaction rates still will be obtained. The rate of 250 kg. of product/hr./g. of Ni found in Run 6 is typical of rates obtainable in oligomerizing propylene at 0° C. according to the invention.

EXAMPLE 7

This run is an embodiment of the invention wherein propylene is dimerized utilizing excess liquid propylene at its boiling point (about 44° C.) as the dimerization solvent. First the catalyst was pre-formed by dissolving 0.02 millimole of triisopropyl phosphine nickel chloride in 20 g. of chlorobenzene, deaerating the solution, saturating the same at room temperature with propylene at 100 mm. Hg pressure, and adding thereto while stirring (Et)$_3$Al$_2$Cl$_3$ in amount such that the Al:Ni ratio was 20:1. Upon mixing of these materials the active catalyst formed and the temperature rose to about 36° C. due to reaction of the propylene. After about 3 minutes, the mixture was introduced into a reaction flask containing 300 ml. of anhydrous liquid propylene at its boiling point. The flask was equipped with a reflux condenser cooled with Dry Ice and a magnetic stirrer, the arrangement being such that air was excluded from the system. The dimerization reaction began immediately upon addition of the preformed catalyst and was continued for 69 minutes. Thereafter the product amounting to 150 g. was recovered from the excess propylene and analyzed. It had about the same composition as the product of Run 6. The average rate of reaction was calculated to be 109 kg./hr./g. of Ni.

EXAMPLE 8

Run 7 was substantially duplicated and the rate of reaction was found to be 85 kg./hr./g. of Ni.

COMPARISON EXAMPLE 9

This example is included for purpose of comparison and shows dimerizing in solvent which is mainly excess liquid propylene but utilizing the prior technique of forming the catalyst in situ in the dimerization solvent. Specifically, the starting solvent was a blend of 100 ml. of liquid propylene and 50 ml. of chlorobenzene, maintained at its boiling point at atmospheric pressure in a reaction flask equipped as in Example 7. A quantity of (Et)$_3$Al$_2$Cl$_3$ was added while stirring the mixture and then 0.016 millimole of triisopropyl phosphine nickel chloride was admixed therein and stirring was continued. The atomic ratio of Al:Ni was about 40. After 88 minutes the reaction mixture was worked up, and it was found that only 18 g. of oligomer product had formed. The corresponding reaction rate was calculated to be 14 kg./hr./g. of Ni.

Comparison of Examples 7 and 8 with Example 9 shows that a 6-8 fold increase in reaction rate was obtained by preforming the catalyst in accordance with the invention even though in Example 9 a higher proportion of chlorobenzene was present during the dimerization step.

In practicing the invention utilizing other nickel phosphine complexes and/or other Lewis acids as herein described, benefits analogous to those shown by the foregoing examples are secured. The substitution of other halobenzenoid hydrocarbons for chlorobenzene in preforming the catalyst gives similar benefits. The advantages of preforming the catalyst are likewise obtained when other olefins as herein specified are utilized instead of propylene as feed to the dimerization step.

I claim:

1. In the dimerization of an olefinic hydrocarbon with a catalyst system comprising the combination of a coordination complex of nickel (II) having any of the formulas

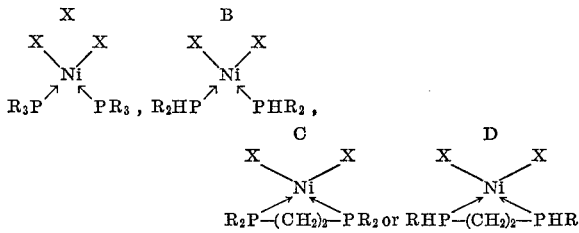

with a Lewis acid of the group RAlX$_2'$, R$_3$Al$_2$X$_3'$ and R$_2$AlX', wherein X is chlorine, bromine or iodine, X' is chlorine or bromine, and each R is a hydrocarbon radical having 1-30 carbon atoms, the improvement which comprises:

(a) pre-forming the catalyst by dissolving said coordination complex and Lewis acid in a relatively small volume of liquid halogenated benzenoid hydrocarbon having 1-2 halogen atoms attached to the benzene ring, in a proportion such that the Al:Ni atomic ratio is in excess of 2:1 and at a temperature in the range of 0 to 150° C.;

(b) admixing the so-formed catalyst with a relatively large volume of hydrocarbon in liquid phase to form a solution in which the solvent is predominantly hydrocarbon;

(c) and contacting said olefinic hydrocarbon with the resulting catalyst at a temperature in the range of −100° C. to 200° C. to effect dimerization.

2. Process according to claim 1 wherein step (a) is carried out by first dissolving said coordination complex in the relatively small volume of liquid halogenated benzenoid hydrocarbon and then admixing said Lewis acid with the resulting solution in the presence of a small amount of the olefinic hydrocarbon.

3. Process according to claim 2 wherein step (a) is carried out at a temperature in the range of 20° to 80° C. and step (c) at a temperature in the range of −50° to 100° C.

4. Process according to claim 3 wherein the hydrocarbon specified in step (b) is said olefinic hydrocarbon.

5. Process according to claim 4 wherein said olefinic hydrocarbon is propylene.

6. Process according to claim 5 wherein said coordination complex has Formula A, the Lewis acid is R$_3$Al$_2$X$_3'$ and said halogenated benzenoid hydrocarbon is a monohalobenzene.

7. Process according to claim 6 wherein X and X' are chlorine and the halogenated benzenoid hydrocarbon is chlorobenzene.

8. Process according to claim 1 wherein the catalyst is pre-formed in step (a) by bringing together the coordination complex and the Lewis acid in a monohalobenzene solvent and in the presence of a small amount of said olefinic hydrocarbon.

9. Process according to claim 8 wherein said monohalobenzene solvent is chlorobenzene.

10. Process according to claim 8 wherein the proportion of coordination complex to Lewis acid is such that the Al:Ni atomic ratio is in the range of 10:1 to 100:1.

11. Process according to claim 10 wherein said coordination complex has Formula A and the Lewis acid is R$_3$Al$_2$X$_3'$.

12. Process according to claim 11 wherein X and X' are chlorine and said monohalobenzene is chlorobenzene.

13. Process according to claim 10 wherein step (a) is carried out at a temperature in the range of 20° to 80° C. and step (c) at a temperature in the range of −50° to 100° C.

14. Process according to claim 13 wherein said coordination complex has Formula A and the Lewis acid is R$_3$Al$_2$X$_3'$.

15. Process according to claim 14 wherein X and X' are chlorine and said monohalobenzene is chlorobenzene.

16. Process according to claim 10 wherein the hydrocarbon specified in step (b) is said olefinic hydrocarbon.

17. Process according to claim 16 wherein said olefinic hydrocarbon is propylene.

18. Process for dimerizing propylene in accordance with claim 1 wherein the catalyst is preformed in step (a) by bringing together, in a monohalobenzene solvent, in the presence of a small amount of propylene and at a temperature in the range of 20° to 80° C., said coordination complex and the Lewis acid in amounts such that the Al:Ni atomic ratio is at least 10:1 wherein in step (b) the so-formed catalyst is admixed with a relatively large volume of liquid propylene, and wherein the temperature in step (c) is in the range of −50° to 100° C.

19. Process according to claim 18 wherein the concentration of nickel in step (a) is in the range of 0.1 to 10 millimoles per liter and the concentration thereof after admixing as per step (b) is in the range of 0.05 to 0.0005 millimole per liter.

20. Process according to claim 1 wherein the concentration of nickel in step (a) is in the range of 0.1 to 10 millimoles per liter and the concentration thereof after admixing as per step (b) is in the range of 0.05 to 0.0005 millimole per liter.

References Cited

UNITED STATES PATENTS

| | | | |
|---|---|---|---|
| 3,306,948 | 2/1967 | Kealy | 260—680 |
| 3,355,510 | 11/1967 | Cannell et al. | 260—683.15 |
| 3,413,376 | 11/1968 | Cleary | 260—683.15 |

PAUL M. COUGHLAN, JR., Primary Examiner

U.S. Cl. X.R.

252—429